US010052878B2

(12) United States Patent
Bonneton (10) Patent No.: US 10,052,878 B2
(45) Date of Patent: Aug. 21, 2018

(54) SYSTEM FOR ADVANCED PROTECTION OF CONSUMABLE OR DETACHABLE ELEMENTS (71) Applicant: Dover Europe Sàrl, Vernier (CH)

(72) Inventor: Damien Bonneton, Hostun (FR)

(73) Assignee: DOVER EUROPE SÀRL, Vernier (CH)

( * ) Notice: Subject to any disclaimer, the term of this patent is extended or adjusted under 35 U.S.C. 154(b) by 0 days.

(21) Appl. No.: 15/549,195

(22) PCT Filed: Feb. 8, 2016

(86) PCT No.: PCT/EP2016/052637
§ 371 (c)(1),
(2) Date: Aug. 7, 2017

(87) PCT Pub. No.: WO2016/124787
PCT Pub. Date: Aug. 11, 2016

(65) Prior Publication Data
US 2018/0022104 A1    Jan. 25, 2018

(30) Foreign Application Priority Data
Feb. 6, 2015 (FR) .................................. 15 50958

(51) Int. Cl.
*B41J 2/175* (2006.01)
*G06F 21/44* (2013.01)
(Continued)

(52) U.S. Cl.
CPC ...... *B41J 2/17546* (2013.01); *G03G 15/0863* (2013.01); *G05B 1/03* (2013.01);
(Continued)

(58) Field of Classification Search
CPC . B41J 2/01; B41J 2/175; B41J 2/17503; B41J 29/393; G03G 15/00;
(Continued)

(56) References Cited

U.S. PATENT DOCUMENTS 4,268,715 A * 5/1981 Atalla ............... G06Q 20/401
235/379
6,076,167 A * 6/2000 Borza ................. G06F 21/32
713/155

(Continued)

FOREIGN PATENT DOCUMENTS

FR          13 52925       3/2013
WO          97/28001 A1    8/1997
(Continued)

OTHER PUBLICATIONS

Search Report issued in French Patent Application No. FR1550958 dated Nov. 13, 2015.
(Continued)

*Primary Examiner* — Anh T. N. Vo
(74) *Attorney, Agent, or Firm* — Pearne & Gordon LLP (57) ABSTRACT A method of authenticating a consumable or detachable element of a continuous inkjet printer, (CIJ), comprising: the controller of the printer generating and dispatching a $1^{st}$ item of random information to an authentication circuit of the element; encrypting the $1^{st}$ item of random information by the authentication circuit using a $1^{st}$ encryption algorithm and a $1^{st}$ secret key to form a $1^{st}$ item of encrypted random information; dispatching the $1^{st}$ item of encrypted random information to the controller; encrypting the $1^{st}$ item of random information by the controller using a $2^{nd}$ encryption algorithm and a $2^{nd}$ secret key to form a $2^{nd}$ item of encrypted random information; and comparing the $1^{st}$ item of encrypted random information with the $2^{nd}$ encrypted item of random information. If the consumable element is (Continued)

authenticated, a shared key part of a $3^{rd}$ key is dispatched by the consumable or detachable element to the CIJ.

19 Claims, 5 Drawing Sheets

(51) Int. Cl.

| | |
|---|---|
| *G06F 21/62* | (2013.01) |
| *G06F 21/72* | (2013.01) |
| *G05B 1/03* | (2006.01) |
| *G06F 21/60* | (2013.01) |
| *G06F 21/45* | (2013.01) |
| *G06F 21/71* | (2013.01) |
| *G06F 21/12* | (2013.01) |
| *G06F 21/30* | (2013.01) |
| *G06F 21/57* | (2013.01) |
| *G03G 15/08* | (2006.01) |

(52) U.S. Cl.
CPC ............. *G06F 21/12* (2013.01); *G06F 21/30* (2013.01); *G06F 21/44* (2013.01); *G06F 21/445* (2013.01); *G06F 21/45* (2013.01); *G06F 21/572* (2013.01); *G06F 21/60* (2013.01); *G06F 21/606* (2013.01); *G06F 21/608* (2013.01); *G06F 21/62* (2013.01); *G06F 21/71* (2013.01); *G06F 21/72* (2013.01)

(58) Field of Classification Search
CPC ........... G03G 15/0863; G03G 15/5066; G03G 21/1878; G06F 21/12; G06F 21/44; G06F 21/445; G06F 21/30; G06F 21/45; G06F 21/60; G06F 21/606; G06F 21/608; G06F 21/62
See application file for complete search history.

(56) References Cited

U.S. PATENT DOCUMENTS

| | | | |
|---|---|---|---|
| 6,446,210 B1* | 9/2002 | Borza | ................. G06F 21/32 |
| | | | 713/150 |
| 6,738,903 B1 | 5/2004 | Haines | |
| 7,917,963 B2* | 3/2011 | Goyal | ............... G06F 21/6209 |
| | | | 726/29 |
| 8,418,258 B2* | 4/2013 | Goyal | ............... G06F 21/6209 |
| | | | 709/217 |
| 2005/0008376 A1 | 1/2005 | Parry | |
| 2007/0160204 A1 | 7/2007 | Kimura | |
| 2009/0222664 A1 | 9/2009 | Cho | |
| 2013/0169992 A1 | 7/2013 | Panshin | |

FOREIGN PATENT DOCUMENTS

| | | |
|---|---|---|
| WO | 99/18544 A1 | 4/1999 |
| WO | 2009/047510 A1 | 4/2009 |
| WO | 2014/154830 A1 | 10/2014 |
| WO | 2015/016857 A1 | 2/2015 |

OTHER PUBLICATIONS

International Search Report issued in Application No. PCT/EP2016/052637 dated Apr. 7, 2016.

Utility U.S. Appl. No. 15/656,613, "Advanced Protection System for Consumable or Detachable Parts for an Industrial Pritner" filed Jul. 21, 2017.

* cited by examiner

SYSTEM FOR ADVANCED PROTECTION OF CONSUMABLE OR DETACHABLE ELEMENTS

TECHNICAL FIELD AND PRIOR ART

The invention relates to the field of continuous inkjet printers (CIJ).

The invention also relates to a device and a method for securing the use of such a printer and/or the use of spare parts or consumables, for example ink or solvent cartridges, used in such a printer.

Continuous inkjet printers (CIJ) are well known in the field of industrial coding and marking of diverse products, for example for marking bar codes, expiry dates on food products, and reference marks or distance marks on cables or pipes, directly on the production line and at high cadence. This type of printer is also found in certain fields of decoration where the graphic printing possibilities of the technology are exploited.

Figure 1:
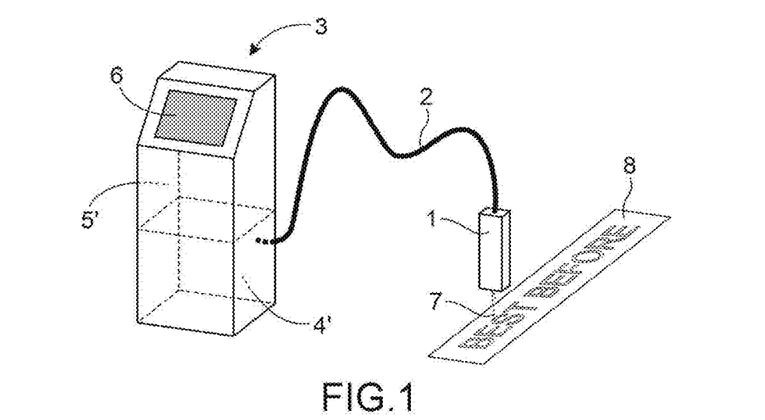
FIG. 1 represents a known structure of a printer.

These printers have several typical subassemblies as shown in FIG. 1.

Firstly, a printing head 1, generally remote from the printer body 3, is connected to same by a flexible umbilical cord 2 containing the hydraulic and electrical connections required for operation of the head, giving it a flexibility which facilitates inclusion of the head on the production line.

The printer body 3 (also called a console or cabinet) usually contains three subassemblies:
- an ink circuit in the lower part of the console (zone 4'), which both supplies the ink to the head, at a stable pressure and with an adequate quality, as well as handling the ink of the jets that is not used for printing;
- a controller situated in the upper part of the console (zone 5'), capable of managing the sequences of actions, and of carrying out processes for activation of the various functions of the ink circuit and the head. The controller 5 may include, for example, a microcomputer or a microprocessor and/or one (or more) electronic cards and/or at least one installed software, the programming of which controls the ink circuit 4 and the printing head 1. This controller can transmit printing instructions to the head and also controls the motors and valves of the system in order to manage the supply of the ink and/or solvent circuit, as well as the recovery of the mixture of ink and air from the head. Therefore, it is programmed for this purpose,
- an interface 6 which gives the operator the means for using the printer and being informed of its operation.

In other words, the cabinet comprises 2 subassemblies: in the upper part, the electronics, electrical supply and operator interface, and in the lower part an ink circuit supplying ink, of nominal quality, under pressure to the head and providing the negative pressure for recovery of the ink that is not used by the head.

Figure 2:
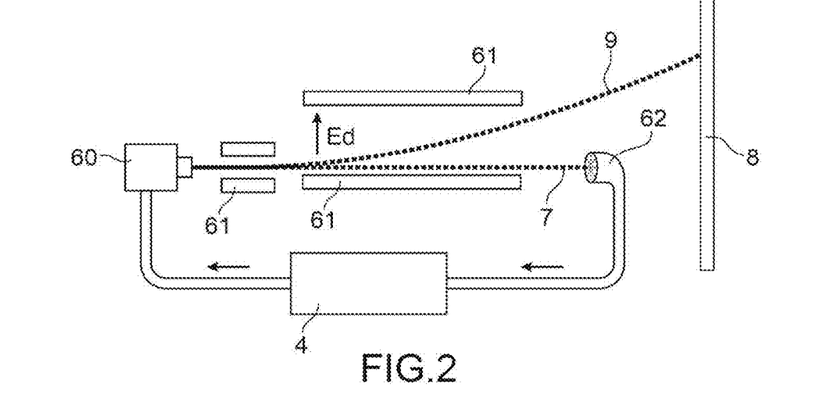
FIG. 2 represents a known structure of a printing head of a CIJ printer.

FIG. 2 schematically represents a printing head 1 of a CIJ printer. It comprises a drop generator 60 supplied with electrically conductive ink, pressurised by the ink circuit.

This generator is capable of issuing at least one continuous jet through a small dimensional opening, called the nozzle. The jet is transformed into a regular succession of identically sized drops under the action of a periodic stimulation system (not illustrated) located upstream of the outlet of the nozzle. When the drops 7 are not intended for printing, they are directed towards a gutter 62 which collects them in order to recycle the unused ink and return them to the ink circuit.

Devices 61 placed along the jet (charge and deflection electrodes) are able, on command, to electrically charge the drops and deflect them in an electric field Ed. The drops are therefore deflected from their natural trajectory on ejection from the drop generator. The drops 9 intended for printing escape from the gutter and are deposited on the medium to be printed 8.

This description can also apply to so-called "binary" or "multi-deflection" continuous jet printers (CIJ). Binary CIJ printers are equipped with a head, the drop generator of which possesses a multitude of jets, each drop of a jet can only be orientated in two trajectories: printing or recovery. In multi-deflection continuous jet printers, each drop of a single jet (or of several jets spaced apart) can be deflected over various trajectories corresponding to the different charge commands from one drop to another, thus producing a sweeping in one direction of the zone to be printed, which is the deflection direction, the other sweeping direction of the zone to be printed being covered by the relative movement of the printing head and the medium to be printed 8. The elements are generally arranged such that these two directions are substantially perpendicular.

An ink circuit of a continuous inkjet printer is used both to supply ink, at a regulated pressure, and possibly solvent, to the drop generator of the head 1, and also to create a negative pressure in order to recover the fluids that are not used in the printing and which then return from the head.

It also allows manages the consumables (distribution of ink and solvent from a reserve) and control and maintenance of ink quality (viscosity/concentration).

Finally, other functions are linked to user comfort and automatic control of certain maintenance operations in order to ensure constant operation whatever the conditions of use. These functions include rinsing the head with solvent (drop generator, nozzle, gutter), assistance with preventive maintenance, for example replacement of components with limited service life, in particular filters, and/or pumps.

The various functions have very different purposes and technical requirements. They are activated and sequenced by the printer controller which will be more complex the higher the number functions and the greater their sophistication.

The consumables are essentially in the form of cartridges or bottles containing ink or solvent suitable for the operation of the machine.

There are various means for identifying such a cartridge or bottle.

Solutions are known based on identification means, as described for example in U.S. Pat. No. 6,738,903, but they are not able to avoid cloning or emulation of the implemented tag, in particular in the case of applications that are not connected to the network.

Another solution is known from WO 97/28001.

However, these solutions do not resolve the problem of guaranteeing the authentic nature of the installed consumable in order to guarantee the behaviour of the printer and the printing performance (quality, resistance, etc.).

This problem can be extended to authentication of spare parts and more generally to detachable elements of the printers or even to the software that the printer can use and/or to the operating modes that the printer can implement.

Another problem is that of being able to configure an inkjet printer in diverse ways, without modifying the printer itself. Various configurations, with different modes of use, may be made necessary by different technical needs.

These problems arise in a context where the printers are not generally connected to a communication network.

PRESENTATION OF THE INVENTION

The invention relates, in particular, to an authentication system based on a secret key (or authentication key).

The invention relates firstly to a method of authenticating a first consumable or detachable element of a continuous inkjet printer, (CIJ) comprising a first authentication method (or first authentication):

- generation, by the controller (or control circuit or device; below the term "controller" is used most often) of the printer of a $1^{st}$ item of random information, and dispatch thereof to an authentication circuit of the $1^{st}$ consumable element, said circuit being for example applied to the element,
- the encryption of the $1^{st}$ item of random information by the authentication circuit of the $1^{st}$ consumable element, using a $1^{st}$ encryption algorithm and a $1^{st}$ secret key, thereby forming a $1^{st}$ item of encrypted random information, and the dispatch of said item of encrypted random information to the controller of the printer;
- the encryption of the $1^{st}$ item of random information by the controller of the printer, using a $2^{nd}$ encryption algorithm, and a $2^{nd}$ secret key, thereby forming a $2^{nd}$ item of encrypted random information;
- and the comparison, preferably by the controller of the printer, of the $1^{st}$ encrypted item of random information with the $2^{nd}$ encrypted item of random information, in order to authenticate, or not, the $1^{st}$ consumable element.

If the comparison is satisfactory, the two algorithms and the two keys correspond, they are for example identical (the two algorithms are identical and the two keys also), and the consumable or detachable element is authenticated and can be used. If not, its use is rendered impossible by the controller (no data can be exchanged between the consumable element and the controller).

If the $1^{st}$ consumable element is authenticated, a $3^{rd}$ key, termed the shared key, or at least a part of a $3^{rd}$ key, termed the shared key, can be dispatched by the $1^{st}$ consumable or detachable element to the continuous inkjet printer.

In this embodiment or in the following, which concerns a control method or device for a consumable element, when only a part of the shared key is dispatched to the printer or to a control device or to the consumable, another part of said key is already contained in the printer in the control device or in the consumable, the 2 parts forming the shared key.

The printer, or the controller thereof, then preferably contains a $3^{rd}$ encryption algorithm, and optionally a part of the shared key; the $3^{rd}$ algorithm can implement said shared key, once all or part thereof is received.

According to a particular embodiment, this method can further comprise a $2^{nd}$ authentication:

- generation, by the authentication circuit of the $1^{st}$ consumable or detachable element, of a $2^{nd}$ item of random information, and dispatch thereof to the printer controller;
- encryption of the $2^{nd}$ item of random information by the controller of the printer using a $2^{nd}$ encryption algorithm and a $2^{nd}$ secret key, thereby forming a $3^{rd}$ item of encrypted random information, and dispatch thereof to the authentication circuit of the 1st consumable element;
- encryption of this $2^{nd}$ item of random information by the authentication circuit of the $1^{st}$ consumable element, using the a $1^{st}$ encryption algorithm and the $1^{st}$ secret key, thereby forming a $4^{th}$ item of encrypted random information;
- comparison, preferably by the authentication circuit of the $1^{st}$ consumable or detachable element, of the $3^{rd}$ item of encrypted random information and the $4^{th}$ item of encrypted random information.

Here again, if the comparison is satisfactory, the consumable or detachable element or the printer is authenticated and can be used. If not, the consumable or detachable element, not recognising the controller or the printer, can refuse communication with the controller or printer, and therefore any subsequent exchange of data.

In other words, the comparison, on the one hand, of a part of the $1^{st}$ item of encrypted random information with the $2^{nd}$ item of encrypted random information and, on the other hand, of the $3^{rd}$ item of encrypted random information with the $4^{th}$ item of encrypted random information, enables authentication of the $1^{st}$ consumable element by the printer and of the printer by the $1^{st}$ consumable element.

The $2^{nd}$ authentication (or $2^{nd}$ authentication process) can take place before the $1^{st}$ authentication process already described above, or afterwards, or at the same time. More generally, the invention relates to a method for authenticating a $1^{st}$ consumable or detachable element of a continuous inkjet printer (CIJ), comprising, in the following order or in an inverse order (or simultaneously):

- a step of authentication of a consumable element by the printer ($1^{st}$ authentication process);
- a step of authentication of the printer by the consumable element ($2^{nd}$ authentication process).

Hence, the invention also relates to a method for authenticating a $1^{st}$ consumable or detachable element and a continuous inkjet printer (CIJ), and exchange of data between these, comprising, in the following order or in an inverse order or simultaneously, a first authentication and a second authentication:

A) the first authentication comprising:

a)—generation, by the controller of the printer, of a $1^{st}$ item of random information and the dispatch thereof to an authentication circuit of the $1^{st}$ consumable element;

b)—encryption of the $1^{st}$ item of random information by the authentication circuit of the $1^{st}$ consumable element, a $1^{st}$ encryption algorithm and a $1^{st}$ secret key, thereby forming a $1^{st}$ item of encrypted random information, and the dispatch of said item of information to the controller of the printer;

c)—encryption of the $1^{st}$ item of random information by the controller of the printer and by a $2^{nd}$ encryption algorithm, and a $2^{nd}$ secret key, thereby forming a $2^{nd}$ item of encrypted random information;

d)—comparison of at least the $1^{st}$ item of encrypted random information with the $2^{nd}$ item of encrypted random information;

e) an authentication step, as a function of the result of the comparison of step d);

B) the second authentication comprising:

f)—generation, by the authentication circuit of the $1^{st}$ consumable element, of a $2^{nd}$ item of random information, and dispatch thereof to the controller of the printer;

g)—encryption of the $2^{nd}$ item of random information, by the controller of the printer, using the $2^{nd}$ encryption algorithm and the $2^{nd}$ secret key, thereby forming a $3^{rd}$ item of encrypted random information, and dispatch thereof to the authentication circuit of the $1^{st}$ consumable element;

h)—the encryption of this $2^{nd}$ item of random information by the authentication circuit of the $1^{st}$ consumable element, using the a $1^{st}$ encryption algorithm and the $1^{st}$ secret key, thereby forming a $4^{th}$ item of encrypted random information;

i)—comparison of at least the $3^{rd}$ item of encrypted random information with the $4^{th}$ item of encrypted random information;

j) an authentication step, as a function of the result of the comparison of step i);

k) the controller of the printer containing a $3^{rd}$ encryption algorithm and a $3^{rd}$ key, termed the shared key, the consumable or detachable element, after the first authentication and the second authentication, despatching to the continuous inkjet printer, or receiving from same, at least one item of encrypted data using said $3^{rd}$ encryption algorithm and said shared key.

Whatever the embodiment, after authentication (for example by comparison of the $1^{st}$ item of encrypted random information with the $2^{nd}$ item of encrypted random information and optionally of the $3^{rd}$ item of encrypted random information with the $4^{th}$ item of encrypted random information), or after the two authentication steps, the method can then comprise:

a)—dispatch of at least a part of a $3^{rd}$ key, termed the shared key, by the $1^{st}$ consumable or detachable element to the continuous inkjet printer or vice versa; the printer comprises a $3^{rd}$ encryption algorithm which will make it possible, using this $3^{rd}$ shared key, to decipher the data sent from the consumable to the printer;

b)—and/or dispatch, by the consumable element, or respectively by the continuous inkjet printer, to the continuous inkjet printer, or respectively to the consumable element, of at least one item of encrypted data, the printer, or respectively the consumable element, optionally comprising a $3^{rd}$ encryption algorithm and a shared key (said shared key can have been dispatched, at least in part, by the consumable, according to preceding step a)), which enables deciphering of said item of data.

The invention also relates to a method of authenticating a consumable or detachable element of a continuous inkjet printer, (CIJ) comprising:

dispatch to the control of the printer, by the authentication circuit of the consumable or detachable element, of a password;

and comparison, by the controller, of said password with a password which it contains (and which is for example recorded in the memory means of the controller).

If the comparison is satisfactory, the use of the consumable, and/or of a software element, can be authorised.

The invention also relates to a method for exchanging data between a consumable or detachable element of a continuous inkjet printer (CIJ) and said continuous inkjet printer (CIJ), wherein:

an authentication process of said consumable or detachable element is carried out for said continuous inkjet printer, according to one of the embodiments of the invention;

and, after comparison of the $1^{st}$ item of encrypted random information with the $2^{nd}$ item of encrypted random information and, optionally, comparison of the $3^{rd}$ item of encrypted random information with the $4^{th}$ item of encrypted random information, all or part of a $3^{rd}$ key, termed the shared key, is dispatched by the consumable or detachable element to the continuous inkjet printer.

The shared key can then be used to decode, using a $3^{rd}$ encryption algorithm contained in the printer, all or part of one or more items of data or information coming from the consumable or detachable element. This $3^{rd}$ encryption algorithm may be different from the $1^{st}$ and $2^{nd}$ encryption algorithms already described above.

To reinforce security, the method implements the secret key or keys, which, through the authentication, only authorise the subsequent exchange of data between the consumable or detachable element and the machine.

Once the shared key is available in the printer (or in the circuit thereof) [for example after dispatch, according to one of the above embodiments which provides a shared key, or at least a part of same, by the consumable or detachable element to the continuous inkjet printer] at least one item of data, encrypted for example by the $3^{rd}$ encryption algorithm, can be dispatched from the consumable or detachable element to the continuous inkjet printer or vice versa; or again this encrypted data can be read by the controller.

More simply, in the case of an authentication by password, after exchange and control of the password, at least one item of data, optionally encrypted, for example by an encryption algorithm, can be dispatched from the consumable or detachable element to the continuous inkjet printer or vice versa. Here, as in the other embodiments of a method (of authentication and/or data exchange) according to the invention or of a device (or of a controller or of a data medium) according to the invention or of a consumable or detachable element according to the invention, this item of data can be one of those mentioned below (for example concerning at least one consumable or at least one spare part that the printer can use, and/or concerning at least one list of software that the printer can use, and/or concerning at least one method of use that that the printer can implement, etc.). In the case of an item of encrypted data, the controller also has means for deciphering the data. After performing an authentication process according to the invention, the consumable or detachable element can dispatch to the continuous inkjet printer, or receive from same, at least one item of encrypted data using an encryption algorithm, and the shared key.

The invention also relates to a method of data exchange between a consumable or detachable element of a continuous inkjet printer, and this continuous inkjet printer, without prior authentication procedure, but by using a consumable, or detachable, element, of the type already described above (or below in this application), this may comprise the means for implementing a $1^{st}$ encryption algorithm, and a $1^{st}$ secret key, enabling a mutual authentication, as well as a $2^{nd}$ encryption algorithm and a key, termed the shared key, the continuous inkjet printer, comprising means for also implementing the $2^{nd}$ encryption algorithm, and the shared key, method wherein:

at least one item of data is transferred between the consumable or detachable element and the continuous inkjet printer, for example dispatched by the consumable or detachable element to the printer, or read by the printer;

the continuous inkjet printer deciphers the one or more items of data thus received.

In other words, it is possible to use a consumable or detachable element according to the invention, in particular to the type already described above or which will be described below, with a printer having a controller that cannot implement an authentication method of the type already described above, or with a printer having a controller that can implement an authentication method of the type already described above.

The shared key used by, or which implements, the encryption algorithm, can vary over time and/or have a limited period of validity.

According to an embodiment of one of the methods according to the invention, the $1^{st}$ secret key and/or, respectively, the $2^{nd}$ secret key, is, or has been, modified using an algorithm implementing an item of digital data available in, or associated with, respectively the consumable or detachable element or the continuous inkjet printer.

The shared key can be, or can have been, modified using an algorithm implementing an item of digital data available in, or associated with, the consumable or detachable element or the continuous inkjet printer.

A method according to the invention can further comprise the exchange, between the controller and the $1^{st}$ consumable or detachable element, and/or the reader, for example, or in particular, by the controller of the printer, and/or by the $1^{st}$ consumable or detachable element, of at least one item of data (which can be exchanged as encrypted data, according to that which has been disclosed above, after authentication of the $1^{st}$ consumable or detachable element):

regarding at least one $2^{nd}$ or one other consumable, different from the $1^{st}$ consumable, and/or at least one spare part that the printer can use, then, optionally, the comparison, with said at least one item of exchanged or read data, of at least one identification data of a $2^{nd}$, or one other, consumable, different from the $1^{st}$ consumable, and/or of one spare part, for example, in a particular case, of that provided by the identification and/or authorisation circuit, or not, by the controller of the printer, of the use of this consumable or this spare part;

and/or regarding at least one list of software that the printer can use, then, optionally, the comparison, with said at least one item of exchanged or read data, of at least one item of identification data of a software with this list, and/or the authorisation, or not, by the controller of the printer, of the use of this software; in this case, the element (for example a software) that can authorise it, or not, is different from the consumable which bears the identification circuit;

and/or regarding at least one method of use that the printer can implement, and, optionally, the adaptation of the operating mode of the printer.

A device (controller, or control device of a printer, or data medium) according to the invention, as described below, enables one or more items of data of this type to be stored.

At least one part of the $2^{nd}$ secret key and/or of the optional shared key and/or data exchanged or to be exchanged can be stored on a card, or on a data medium, physically separated from the printer and from the $1^{st}$ consumable or detachable element, and which exchanges, for example by RFID or by contact, data with the printer using communication means, provided both on the card or the data medium, as well as in the printer.

Generally, data can be exchanged between the printer and a circuit of the consumable or detachable element. The data can be exchanged by RFID or by contact. Said card, or said data support, can therefore transmit to the printer at least one part of the $2^{nd}$ secret key and/or of the optional shared key and/or of the data.

The $1^{st}$ consumable or detachable element, and/or any other consumable or detachable element, can be an ink or solvent cartridge or a filter, or a pump, or a solenoid valve, or removable element, for example of the ink circuit of the printer or of the printing head, or even a card or a data medium.

In a particular embodiment, the $1^{st}$ consumable or detachable element is a data medium, at least one other consumable or detachable element, different from the $1^{st}$, or at least one spare part being an ink or solvent cartridge or a filter, or a pump, or a solenoid valve, or a removable module, for example of the ink circuit of the printer or of a printing head of the printer, or a software or a function of the printing machine.

In this case, there is:

authentication, by the controller of the printer, of the data medium;

exchange, between the data medium and the controller, or reader, by the controller, in the medium, of at least one item of data relating to the use of at least one other consumable or detachable element, different from the data medium, or a spare part (for example of the type already described above) and/or of at least one software that the printer can use and/or at least one method of use that the printer can implement;

optionally, authentication, by said controller of the printer, of a consumable or detachable element, different from the data medium, or of a spare part;

then optionally:

a comparison by said controller, of at least one item of identification data, respectively of a consumable or of a spare part and/or of a software, with said at least one read or exchanged item of data, and/or authorisation, or not, by the controller, of the use of this consumable or this spare part and/or this software;

and/or a comparison, by said controller, of at least one method of use that the printer can implement, with said at least one item of read or exchanged data, relating respectively to at least one method of use (or of one item of data which is related) that the printer can implement and, optionally, the adaptation of the mode of operation of the printer (for example, as a function of the result of the comparison, by utilisation, or not, of said method of use).

The invention also relates to a controller or a control device, of an inkjet printer, or a data medium for controlling a continuous inkjet printer (CIJ), implementing a method such as that described above. Such a controller or device, or data medium, comprises means for at least:

generating a $1^{st}$ item of random information, and despatching same, for example to an authentication circuit of a $1^{st}$ consumable element;

encrypting this $1^{st}$ item of random information, using a $2^{nd}$ encryption algorithm and a $2^{nd}$ secret key, thereby forming a $2^{nd}$ item of encrypted random information;

receiving a $1^{st}$ item of encrypted random information, for example from a $1^{st}$ consumable element (this $1^{st}$ item of encrypted random information can have been obtained by encrypting the $1^{st}$ item of random information using a $1^{st}$ encryption algorithm and a $1^{st}$ secret key);

comparing said received $1^{st}$ item of encrypted random information and the $2^{nd}$ item of encrypted random information.

The controller can then authenticate, or not, the $1^{st}$ consumable element, as a function of the comparison thus performed.

The invention also relates to a controller, or a device, or a data medium, for controlling a continuous inkjet printer, in order to authenticate a consumable or detachable element of a continuous inkjet printer (CIJ), comprising:

means for generating an item of random information, and means for despatching same to an external circuit, for example an authentication circuit of the element;

means for encrypting this item of random information, using a $1^{st}$ encryption algorithm, and using a $1^{st}$ secret key, thereby forming an item of encrypted random information;

means for comparing this item of encrypted random information with another item of encrypted random information received from an external circuit, for example from a consumable or detachable element.

Optionally, said means can allow granting of the authorisation for use, or not, of a consumable or detachable element and/or the authentication, or not, of the consumable as a function of the result of the comparison. In the absence of authentication, no data can be exchanged between the consumable element and the controller.

The controller or the device, or the data medium, can comprise means for receiving at least a part of a key, termed the shared key, dispatched by a circuit, for example by said consumable or detachable element.

The controller or the device, or the data medium, can comprise means for storing said $2^{nd}$ key, termed the shared key, and a $2^{nd}$ algorithm, termed the deciphering algorithm, which will implement said shared key when this has been completely or partially received.

The controller or the device, or the data medium, can further comprise:
  means for receiving a $2^{nd}$ item of random information, for example from said consumable or detachable element;
  means for encrypting this $2^{nd}$ item of random information, using said $1^{st}$ encryption algorithm, and using said $1^{st}$ secret key, thereby forming a $3^{rd}$ item of encrypted random information;
  means for despatching said $3^{rd}$ item of encrypted random information to a circuit, for example to the consumable element, or means for comparing said $3^{rd}$ item of encrypted random information and a $4^{th}$ item of encrypted random information received from an external circuit, for example from said element; the $4^{th}$ item of encrypted random information can result from encrypting of the $2^{nd}$ item of random information using a $2^{nd}$ secret key and a $2^{nd}$ encryption algorithm;
  optionally: means for authenticating, or not, a consumable element as a function of the result of the comparison between the $1^{st}$ item of encrypted random information and the $2^{nd}$ item of encrypted random information and, optionally, between the $3^{rd}$ item of encrypted random information and the $4^{th}$ item of encrypted random information.

In general, preferably, in a method or in a device (controller or circuit or card or data medium) or in a consumable or detachable element according to the invention, each authentication (the $1^{st}$ and $2^{nd}$ in the example above) is performed by the component which triggered it (or which dispatched the item of random information—not yet encrypted—to another component; therefore, respectively, by the printer and by the consumable in the examples above); in the case of 2 authentications, the use of a consumable will only be possible if the 2 authentications are valid. In other words, in the first case of a printer and a consumable (or detachable) element and when a double authentication is implemented, it is preferably the printer which authenticates the consumable and the consumable which authenticates the printer.

The controller or the device or the data medium, may also comprise means for receiving, from an external circuit, for example from a consumable element, at least one item of encrypted data and means for deciphering said item of data using an encryption algorithm, and a key, termed the shared key. Examples of such data have already been given above.

A controller or device or data medium according to the invention may further comprise RFID means or means for data exchanged by contact, in order to exchange data with a circuit, for example of a consumable or detachable element of the printer and/or with a data medium, itself provided with RFID means or means for exchanging data by contact.

According to a particular embodiment, the $2^{nd}$ key can vary over time, and/or comprise means for varying same, or varying the contents of same over time.

As already previously mentioned, such a controller or device or data medium can further comprise means for:
  storing at least one item of data, or a list of data, concerning at least one consumable or detachable element (for example a $2^{nd}$ consumable or detachable element, different from the $1^{st}$) or at least one spare part that the printer can use and/or at least one software that the printer can use, and/or at least one method of use that the printer can implement;
  and, optionally, for:
  comparing at least one item of identification data of a consumable and/or a spare part and/or a software comprising said item of data or said list;
  and/or comparing at least one method of use, with said at least one item of stored data concerning at least one method of use that the printer can implement;
  and/or authorising, or not, the use of this consumable or this spare part or this software or this method of use, as a function of the result of the preceding comparison.

Such a controller or control device of a continuous inkjet printer (CIJ) can enable authentication of a consumable or detachable element of a continuous inkjet printer (CIJ), and comprises:
  means for authenticating, according to a method that has already been described above, a data medium (the consumable of the authentication method above therefore is, or is replaced by, a data medium);
  means for receiving, from said data medium, said at least one item of data concerning at least one consumable (other than the data medium) or at least one spare part that the printer can use, and/or at least one software that the printer can use and/or at least one method of use that the printer can implement.

The invention also relates to a consumable or detachable element of a continuous inkjet printer (CIJ), comprising means for implementing a method such as already described above. Said means enable at least:
  generating of an item of random information, and despatching of same to an external circuit, for example a controller of a printer, or receiving of an item of random information, for example from the controller of a printer;
  encrypting this item of random information, using a $1^{st}$ encryption algorithm and a $1^{st}$ secret key, thereby forming an item of encrypted random information;
  comparing this item of encrypted random information with another item of encrypted random information received, for example, from a controller of a printer.

The invention also relates to a consumable or detachable element for a continuous inkjet printer (CIJ), comprising:
  means for generating an item of random information and means for despatching same to an external circuit, for example a controller of a printer, or means for receiving an item of random information, for example from the controller of a printer;

means for encrypting this item of random information using a $1^{st}$ encryption algorithm and a $1^{st}$ secret key, thereby forming an item of encrypted random information;

means for comparing this item of encrypted random information with another item of encrypted random information received, for example, from a controller of a printer.

A consumable or detachable element for a continuous inkjet printer (CIJ), can further comprise:

means for receiving at least one $2^{nd}$ item of random information, for example from said printer;

means for encrypting this $2^{nd}$ item of random information, using said $1^{st}$ encryption algorithm and said $1^{st}$ secret key, thereby forming a $3^{rd}$ item of encrypted random information;

means for despatching said $3^{rd}$ item of encrypted random information to a circuit, for example to the printer, or means for comparing said $3^{rd}$ item of encrypted random information with a $4^{th}$ item of encrypted random information received for example from the printer; said $4^{th}$ item of encrypted random information can be obtained by encrypting the $2^{nd}$ item of random information using a $2^{nd}$ encryption algorithm and a $2^{nd}$ secret key stored in the printer;

and optionally; means for authenticating, or not, the printer as a function of the result of the comparison between the $1^{st}$ item of encrypted random information and the $2^{nd}$ item of encrypted random information and, optionally, between the $3^{rd}$ item of encrypted random information and the $4^{th}$ item of encrypted random information.

A consumable or detachable element according to the invention can further comprise means for despatching at least one item of data to the printer, encrypted using an encryption algorithm and a key, termed the shared key.

Whatever the embodiment of this consumable or detachable element, its means can optionally allow granting of the authorisation for use, or not, of the consumable or detachable element and/or of the printer. In the absence of authentication, no data can be exchanged between the consumable element and the controller. Such an element can comprise means for storing a $2^{nd}$ key, termed the shared key, and a $2^{nd}$ encryption algorithm, which can vary over time. Such an element can comprise means for despatching a key, termed the shared key, and/or an algorithm, termed the encrypting and deciphering algorithm, for example to a controller of a printer, or for receiving such a key, for example from such a controller.

Such an element can comprise RFID means or means for exchanging data by contact, in order to exchange data, for example with a controller of a printer that is itself provided with RFID means for means for exchanging data by contact.

The invention also relates to a continuous inkjet printer, comprising:

an ink circuit, a printing head, means for hydraulic connection between the ink circuit and the printing head, means for electrical connection for supplying electrical power to said printing head, means for implementing a method according to the invention, for example a method for authenticating a consumable or detachable element, such as described above.

Such means enabling:

generating of $1^{st}$ item of random information, and dispatch of same, for example to an authentication circuit of a $1^{st}$ consumable element;

encrypting this $1^{st}$ item of random information using a $2^{nd}$ encryption algorithm and a $2^{nd}$ secret key, thereby forming a $2^{nd}$ item of encrypted random information;

receiving a $1^{st}$ item of encrypted random information, for example from a $1^{st}$ consumable element (this $1^{st}$ item of encrypted random information may have been obtained by encrypting the $1^{st}$ item of random information using a $1^{st}$ encryption algorithm and a $1^{st}$ secret key);

comparing said received $1^{st}$ item of encrypted random information and the $2^{nd}$ item of encrypted random information.

Said means can thus authenticate, or not, the $1^{st}$ consumable element.

The invention also relates to a continuous inkjet printer, comprising:

an ink circuit, a printing head, means for hydraulic connection between the ink circuit and the printing head, means for electrical connection for supplying electrical power to said printing head, a device according to the invention, for example a device for authenticating a consumable or detachable element, and/a data medium, such as described above.

A continuous inkjet printer according to the invention may further comprise at least one consumable or detachable element according to the invention, such as described above and below. It may further be provided with a data medium such as described above.

DETAILED PRESENTATION OF AN EMBODIMENT

Figure 3:
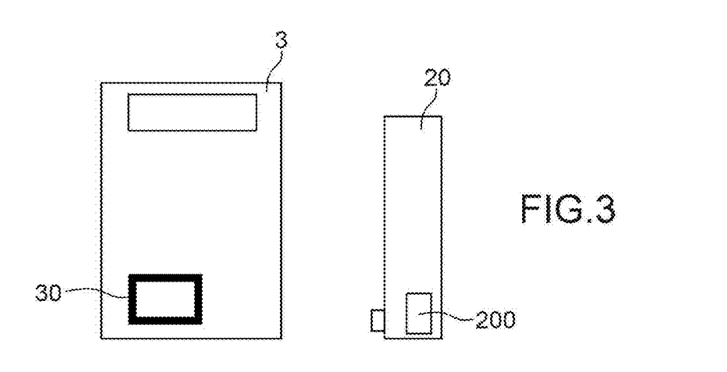
FIG. 3 schematically represents a printer and an ink cartridge, provided with a tag, according to the present invention.

FIG. 3 represents, highly schematically, the body 3 of a printer and a consumable 20, for example a spare part or an ink or solvent cartridge. The term "consumable element" refers to an element intended to be renewable due to reduction of its contents or due to its consumption, for the performance of a function of the printer. This can also be an element for which authorisation for use is given in a time-limited manner, for example a software or a software function.

The term "detachable element" refers to an element which must be temporarily connected in order to implement a function of the printer.

In the following, the example of the ink cartridge will frequently be cited: it can be connected to the printer in order to supply the printer with ink. The cartridge is both consumable and detachable. However, the invention also applies to a spare part, for example a filter or a pump or a solenoid valve, or any other module or subassembly of the printer, for example a removable module such as described in application PCT/EP2014/056215. Each of these elements has a limited service life, at the end of which it must be replaced for the proper operation of the printer. Another example, described below, is that of an authentication card.

The machine, in fact the controller thereof, is equipped with communication means 30, for example RFID communication means, which enable dialogue with said consumable. In addition, the controller is programmed to implement the steps described below.

The consumable 20 is equipped with a circuit 200 (hereinafter referred to as a "tag") which allows it to implement the steps described below. This circuit can be realised in the form of a processor, a microprocessor or an FPGA, for example. This circuit can be programmed to implement a method according to the invention. Communication means are also provided, for example RFID communication means, which enable dialogue with the controller. As a variant, the communication between the body 3 of the printer and the consumable 20 can be communication by contact.

In this case, contacts are provided on each of the circuits to ensure the transmission of data between the two circuits.

In the 2 cases, RFID communication and contact communication, an event will trigger a $1^{st}$ dialogue step, which involves an authentication or a data exchange. This is the case when it is necessary to use the consumable or detachable element, for example:
- during the control at printer start-up, the printer detects the presence of the consumable or detachable element, this detection forming the event above;
- or during connection of the consumable or detachable element, causing a detection by the controller which then triggers a method according to the invention;
- or when the need for the element arises, for example when a low level of ink is detected in the main reservoir, requiring it to be supplied by the ink cartridge.

The circuit 201 is for example installed against a wall of the consumable, in such a way as to facilitate the dialogue (or data exchange) with the controller.

Figure 4:
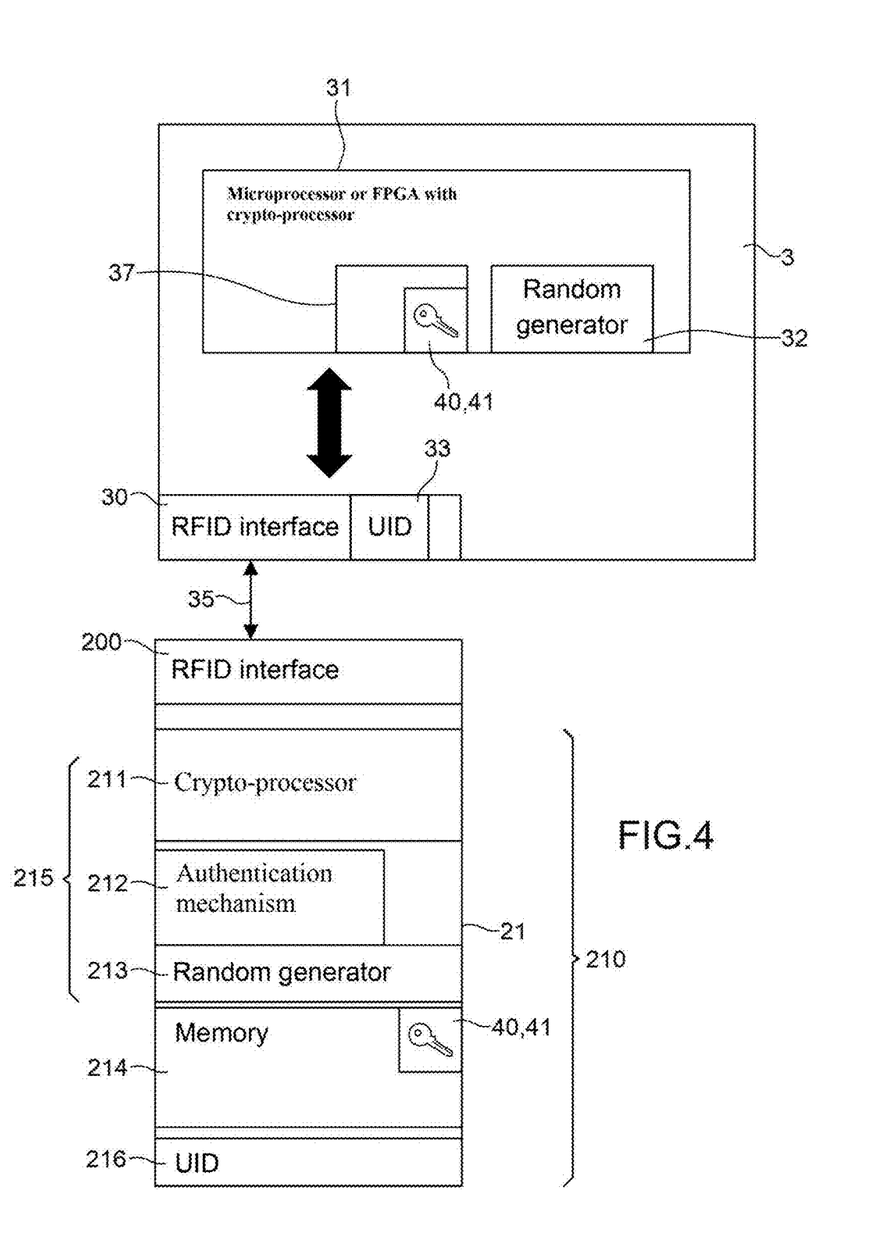
FIG. 4 represents production details of a controller and a tag of and ink cartridge, according to the present invention.

FIG. 4 shows an embodiment of this architecture in a slightly more detailed manner, in the version of same with RFID communication means.

Reference sign 31 designates a controller circuit 3, realised, for example, in the form of a microprocessor or an FPGA, programmed to carry out certain functions or method steps. For example, this circuit 31 is provided with means 32 for generating one or more items of information, for example random numbers. This circuit can be equipped with memory means 37 for storing data, and in particular data for implementing a method according to the invention, for example data relating to a shared key 40 and/or a secret key 41. As explained below, the controller may not comprise:
- a shared key, only being supplied with the shared key during realisation of an event such as the start of an interaction session with the tag;
- or a secret key, no authentication process of the type described below being implemented.

A shared key can be exchanged, at least in part, between the consumable and the controller, in general after authentication as explained below.

In the course of a method according to the invention, a secret key is not exchanged between the consumable and the controller.

In the present application, an algorithm implements a key. Each algorithm is defined by a set of instructions, stored in the corresponding circuit 31, 210, which code the steps of the algorithm.

This circuit 31 will supply, to the means 30, data to transmit to the consumable (in fact: to the circuit—described below—associated with the consumable), and/or receives, via the means 30, data transmitted by the same consumable (in fact: by the circuit—described below—associated with the consumable).

On the consumable side, reference sign 200 designates the RFID interface of the tag 21.

Reference sign 210 designates a circuit of the tag, realised for example in the form of a microprocessor or an FPGA, which is programmed to perform certain functions or method steps according to the invention. For example, this circuit 210 is equipped with means, globally designated by reference sign 215, comprising means 213 for generating one or more items of information, for example random numbers, means 212 implementing an authentication method and encryption means 211. This circuit can be equipped with memory means 214 for storing data, and in particular data for implementing a method according to the invention, for example data relating to a shared key 40 and/or a secret key 41.

This circuit 210 will supply, to the means 200, data to be transmitted to the controller 3, or to be implemented by the controller (for example in order that it can read same) and/or receives, via the means 200, data transmitted by the circuit 31 and the controller means 30.

Reference sign 35 symbolises the data exchanges between the controller and tag of the consumable. As indicated above, it involves in this case an example with an exchange of data by RFID mode.

According to one particularly interesting embodiment, the shared key 40, which is a different key from the secret key 41 (it can for example be more easily decoded than the secret key) serves mainly, or even exclusively, for encrypting information stored in the memory. The secret key 41 serves mainly, or even exclusively, for authentication of the consumable by the controller or for reciprocated authentication of the consumable and of the controller. The risk of "piracy" is limited, i.e. the risk of non-authorised use of data contained in the tag and, consequently, of the associated consumable.

The shared key can be, for example:
- determined or chosen, by the manufacturer of the controller, for example during manufacture thereof; optionally it varies over time, for example periodically, the controller can then have the list of keys or the algorithm allowing the shared key that is to be used to be recovered at the desired time;
- or be supplied by the tag to the controller, only when the authentication has been validated.

Figure 5A:
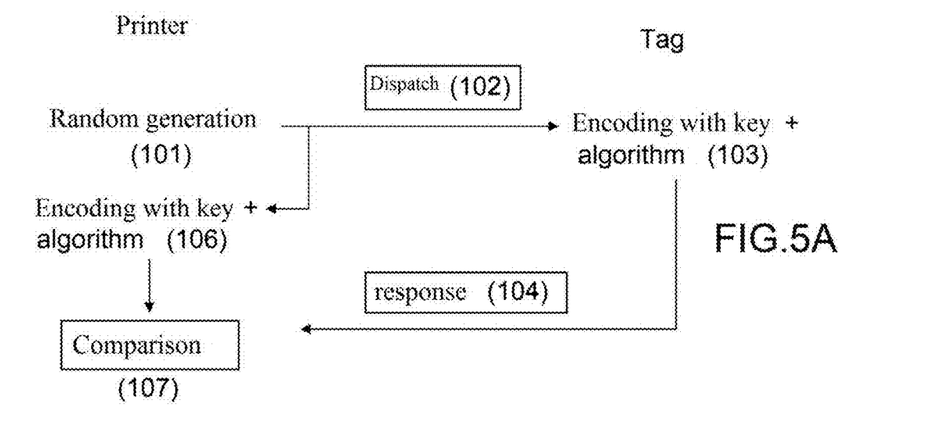
FIGS. 5A and 5B represent steps of an authentication method according to one aspect of the invention.

An example of a method that is able to be implemented by this system will be described, with reference to FIG. 5A. It involves an algorithm, or a method of authentication before the exchange of data between tag and controller. As explained above, some methods according to the invention do not allow the prior implementation of this authentication.

According to this example, both the controller of the printer and the tag of the consumable, store and implement a secret key 41 and a shared key 40; an encryption algorithm implements the secret key, the data relating to this algorithm being stored both in the controller and in the tag.

On realisation of an event, for example one of those mentioned above, the controller generates a 1$^{st}$ random number (more generally, an item of information) A (step 101) which it dispatches (step 102) to the tag of the cartridge; the tag encrypts the number (step 103) using its encryption algorithm and the secret key 41 and re-dispatches (step 104) this encrypted number C(A) to the printer.

The controller 3 performs the same operation: it encrypts this same number (step 106) using its encryption algorithm and the secret key 41, thereby forming C'(A).

The circuit of the controller 3 compares (step 107) the result C'(A) obtained by the internal calculation of same with that C(A) sent by the tag.

If C'(A)=C(A) (or, more generally, if a relationship between C(A) and C'(A) is satisfied, allowing their agreement or correspondence to be determined), then the tag—and the associated consumable—is authentic and the data, for example confidential data contained in the tag, can be exchanged between this tag and the controller. These data can be qualified from technical use data (they may concern technical aspects or technical functions of the machine and/or technical aspects of the functioning of the machine). If not, the tag, and the consumable with which it is associated, is recognised as being non-authentic, and said data cannot be exchanged between this tag and the controller.

More generally, during the installation of the spare part or before sampling a consumable (for example a fluid such as the ink or solvent) in a cartridge or a bottle, an authentication can be carried out in the manner that will now be described.

During the implementation of this authentication method, the shared key 40 does not play a role, and only the secret key is used; this secret key enables authorisation of the transmission of information from the "tag" to the controller, and vice versa. Indeed, at this stage, data (other than those relating to the authentication phase) are not yet being exchanged. It is therefore possible to not supply the shared key, to one or other of the 2 elements (consumable, controller), until after successful authentication.

For example, the shared key is dispatched by the tag 20 to the controller 3 after validated or successful authentication. This is highly advantageous in embodiments in which the shared key is modified: there is then no need to reprogram the elements (tag, controller) which implement it. More specifically, a consumable will itself supply the (shared) key to the printer, which will enable decoding of the exchanged data. If this key has changed or has been modified (for example due to technical developments or algorithmic modifications), there is no need to act on the printer, which recovers the new shared key during its 1$^{st}$ interaction (after authentication) with the new consumable which itself has the modified shared key. In addition, no means for synchronisation of the keys is implemented.

Figure 5B:
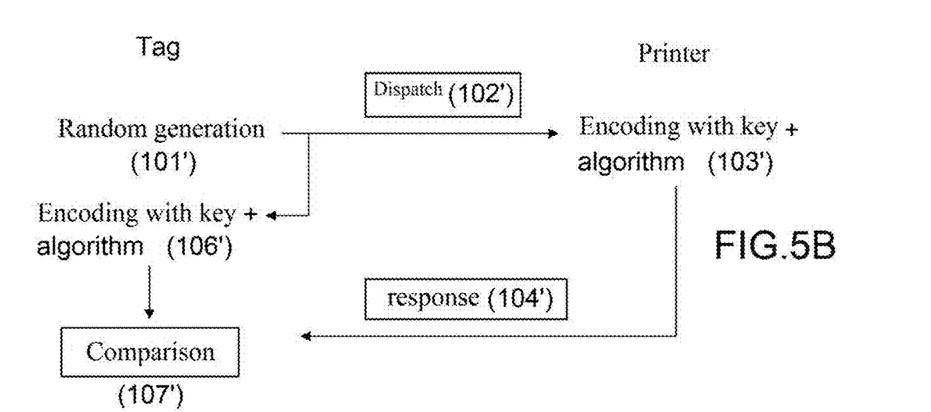

In order to better protect the data of the tag, the authentication can be mutual and the tag can in its turn generate a random number which is submitted to the printer, in accordance with the method of FIG. 5B:

the tag generates a random number (more generally, an item of information) A (step 101') which it dispatches (step 102') to the controller; the controller encrypts the number (step 103') using its encryption algorithm and the secret key 41 and re-dispatches (step 104) this encrypted number C(A) to the tag;

the controller performs the same operation: it encrypts this same number (step 106') using its encryption algorithm and the secret key 41, thereby forming C'(A);

the tag compares (step 107') the result C'(A) obtained by the internal calculation of same with that C(A) sent by the controller.

If C'(A)=C(A) (or, more generally, if a relationship between C(A) and C'(A) is satisfied, allowing their agreement or correspondence to be determined), then the tag can exchange data with the controller. If not, the latter is recognised as not authentic, or more generally as not authorised to exchange data with the controller. It is optionally possible to proceed in the inverse order: the method described above with reference to FIG. 5B is preformed first, followed by the method described above with reference to FIG. 5A.

In general, in the case of a mutual authentication, the two authentications will be preferably validated (respectively by the controller or by the consumable) in order to conclude with a possible exchange of data between the consumable and the printer and to authorise such an exchange, and subsequent use of the consumable.

In order to diversify the secret key 41, the latter can be diversified, for example using an algorithm. For example, it is combined with an item of identification information, which may be a number such as a serial number or a UID (unique identification number) 33 of the controller and/or 216 of the tag (FIG. 4), and/or date according to an algorithm.

In a variation, the secret key 41 is present in the tag and the controller is then modified using an algorithm, by using for example another number (available in the tag and/or the printer), for example before coding (step 103, 103').

This diversification, which can be applied to the shared key, makes the system more robust because, due to this fact, the key concerned is only valid for said tag, said printer or said tag/printer combination.

On the occurrence (before, during or after) of this diversification step, the tag can be made to supply the controller with the data used for the diversification.

The following can be a variant of the authentication method described above.

The consumable communicates a password to the controller; the controller compares this password with a password that it contains (and which is saved in the memory means of the controller) and, as a function of the result of the comparison, the use of the consumable is authorised or not. The same can apply to a software.

Once the authentication has been successfully completed, data can be exchanged or transferred between the tag and the controller, for example made available to the controller by the tag. In general this exchange is carried out at the initiative of the controller, the tag making available to the controller, on request therefrom, data which it dispatches or which it allows the controller to read.

However, according to a yet more powerful method in terms of security, once the authentication has been successfully completed, the tag supplies the shared key 40 to the controller (respectively to the tag). In a variant:

the controller supplies the shared key to the tag;

the controller and the tag each supply a part of the shared key, respectively to the tag and to the controller.

After authentication, it is possible to carry out not only data exchange, which allows successful completion of the authentication, but also, and before data exchange, communication of at least one part of the shared key 40 which will enable decoding of this exchanged data. This could be the case, for example, when a "session" (period—which can be very short, for example on the order of several minutes—during which a tag and a controller are set in uninterrupted connection), the controller only receiving the shared key for the session in question. The start of the session is for example the end of the authentication process, the end of a session is for example any other event after the start, for example a power outage. To strengthen security still further, this key can have only been created, for example by a random process, at the time of the start of this session, or, more generally, at the start of a determined period, during the realisation of an event or of a determined event, for example one of those mentioned above. Such a temporary key can optionally have, with respect to a permanent shared key, a reduced length or size: the size of the memory for storing the temporary key is reduced, and the calculation time of any operation utilising the temporary key is also reduced.

According to one embodiment, the shared key 40 can vary over time. In this case, means 31 and/or 210 contain means, a software and/or a circuit programmed according to an algorithm, to make this key 40 change over time.

As previously, the secret key preferably remains dedicated to authentication.

The example is also given above of a shared key created at the time of the realisation of an event (at the start of a session or at the time of another determined event).

The method described above can guarantee the authentic aspect of the consumable and/or of a spare part and the inviolability of data stored in this tag.

The algorithm or method disclosed above can be implemented by the printer, using the controller thereof, programmed for this purpose, and by the tag also programmed for this purpose.

Two different examples of use will be given, with reference to FIGS. 6A and 6B.

In the two cases, a tag 200 according to the invention, of the type illustrated in FIG. 4, is used and provided with a secret key 41 and a shared key 40. The tag also contains the data 50 that is intended to be exchanged with the controller.

Figure 6A:
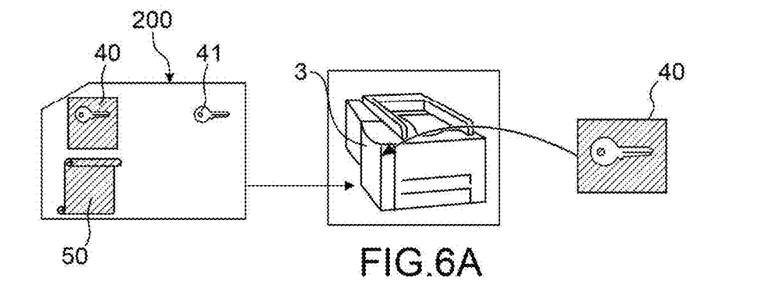
FIGS. 6A and 6B represents the uses of a tag according to one aspect of the invention.

The controller of the printer of FIG. 6A only possesses the shared key 40, installed in the controller before any contact with a tag 200 (the shared key can nevertheless, in this case also, change over time). No authentication method can therefore be implemented and the data 50 are exchanged between the tag 200 and the controller without authentication, even though the tag possesses the secret key and the shared key.

Figure 6B:
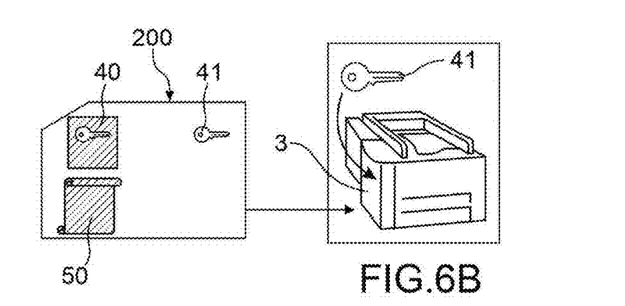

According to another utilisation, the controller of the printer of FIG. 6B possesses the secret key 41. It can therefore first implement an authentication method, then the data 50 are exchanged between the tag 200 and the controller 3 after validation of the authentication. As explained above, the shared key 40 can be supplied to the controller after authentication and/or be able to vary over time.

Consequently, a tag according to the invention is compatible with a simple controller (case shown in FIG. 6A) provided with a shared key but not a secret key, or with a more evolved controller (case shown in FIG. 6B), provided with a secret key and optionally with the shared key.

In general, the fact of possessing, in the tag, a shared key 40 and a secret key 41 enables:

encrypting of the data 49 to be inserted in the tag in the form of encrypted data 50, using the algorithm of the shared key 40;

and/or encrypting of the shared key 40 using the algorithm of the secret key 41, in particular if the memory area containing the shared key is accessible to the reader.

Figure 7:
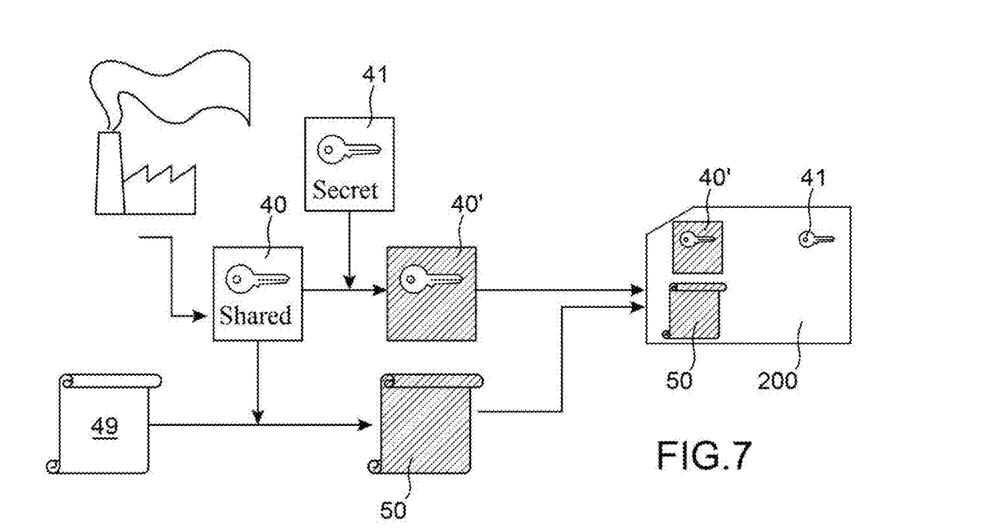
FIG. 7 represent steps for producing a tag according to one aspect of the invention.

An example of a method for preparing or manufacturing a tag 200 is illustrated in FIG. 7, wherein:

data 49, to be stored in the tag, are encrypted using the shared key 40 (not yet encrypted by the secret key, see below); reference sign 50 designates the data that is encrypted and stored in the tag;

the shared key 40 is encrypted using the algorithm of the secret key 41, in order to form the shared key 40' stored in the tag 200.

The tag can therefore contain encrypted data 50, the secret key 41 and the shared key 40, the latter being optionally encrypted by the secret key (and then being stored in the form 40').

Such a method can be carried out by the manufacturer of the printer and/or of consumables.

An example of manufacture or preparation of a consumable element according to the invention and of a printer according to the invention can be the following:

1. Preparation of the consumable:
In the tag, are stored:
the $1^{st}$ authentication algorithm and the $1^{st}$ authentication key;
and the $2^{nd}$ algorithm and the $2^{nd}$ key, termed the shared key, optionally variable and/or optionally encrypted using the $1^{st}$ key;
the encrypted data (encrypted by the shared key).

2. Preparation of the printer:
In the printer (or its controller) are stored:
the $1^{st}$ authentication algorithm and the $1^{st}$ authentication key;
and the $2^{nd}$ algorithm and the $2^{nd}$ key, termed the shared key, optionally variable and/or optionally encrypted using the $1^{st}$ key (case shown in FIG. 7).

After the manufacturing or preparation steps, an authentication process can be completed, as already explained above.

During a process of data exchange between printer (controller) and tag 200, the data can be dispatched from the printer (or from the controller), to the tag, said data having been encrypted using the shared key. Data dispatched by the tag to the controller are read (deciphered) by the controller, also using the shared key. The shared key is also used in the tag for despatching data to the controller or for reading or writing the data dispatched by the controller.

Examples are given below concerning the nature of the data 49 (or use data) stored in the tag and which can be dispatched to the controller.

Figure 8A:
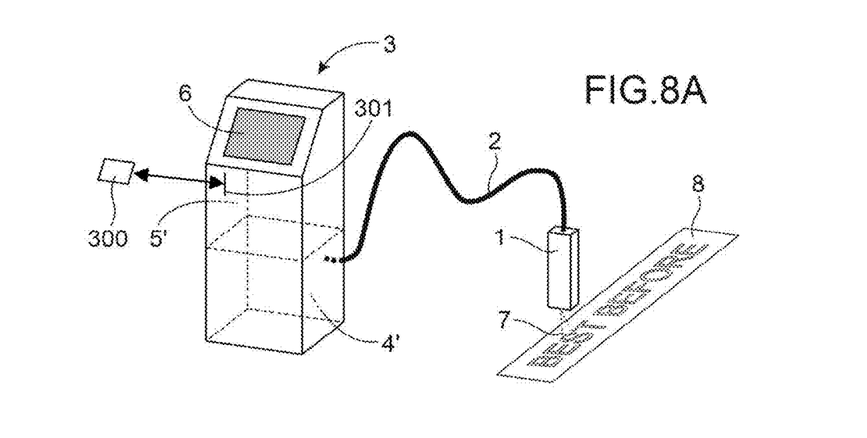
FIGS. 8A and 8B represent embodiments of another aspect of the invention, with individual identification card of the printer.
Figure 8B:
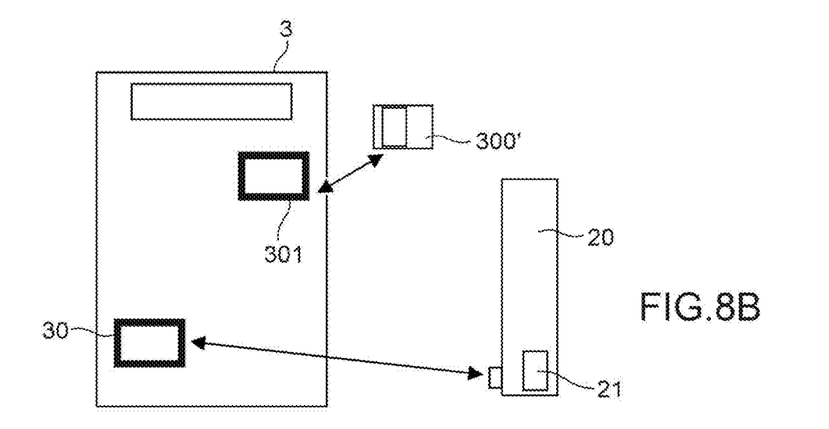

According to another embodiment, shown schematically in FIGS. 8A and 8B, the algorithm or the methods disclosed above can be implemented by the machine, using an authentication card 300, 300' associated with same. Here "card" shall mean any type of data medium (USB memory, ROM, RAM, flash memory, optical medium such as a CD, or magnetic medium, etc.). This card 300, 300' is a consumable or detachable element according to the meaning given above. However, it is different from another consumable or detachable element, such as a cartridge or a spare part or a software, for which it will allow authentication.

This card contains or comprises communication means, for example RFID communication means, which allow dialogue with the controller. As a variant, the communication between the body 3 of the printer and the card can be communication by contact.

This card will itself be subject to an authentication process such as that described above. It can therefore contain the data which will allow such an authentication method to the performed; for example, it comprises a circuit, such as circuit 200 which has been described above, which will contain the data which will enable such an authentication method to be performed.

It may for example contain at least a part of the information or data which will be transmitted to the controller, or exchanged therewith, for example on request of the controller, and allow the controller to implement the steps described above.

As described above, the machine (or the printer) is then equipped with communication means, for example RFID communication means, or means for communication by contact, which enable dialogue with elements such as the consumables. However, according to one embodiment, the card 300, 300' contains encryption information which allows implementing of the steps described above. This card generates, for example, random numbers for encryption, which are transmitted to the controller, which transmits them to the tag of the consumable 20. The tag carries out the encryption operations and re-dispatches (step 104) the encrypted information to the controller, which transmits it to the card 300, 300'. The card has performed its own encryption (step 106) and possesses means which allow it to carry out the comparison step (step 107). It then delivers to the controller, or not, an authorisation for use of the consumable 20.

In a variation, the exchanges are made uniquely or mainly with the controller, which itself performs the comparisons between the data of the card 300, 300', on the one hand, and the data of the consumable element 20, on the other hand. The controller then validates the use of the consumable element if, firstly, it has authenticated this element (according to the authentication process as described above) and, secondly, after authentication of the card 300, 300' according to an authentication method such as described above for the consumable elements, it has obtained the authorisation for using the consumable by the data exchanges with the card. The order of the steps can therefore be:

a) authentication of the card 300, 300', according to one of the methods described above;

b) authentication of the consumable 20, according to one of the methods described above;

c) reading, by the controller, of at least one item of data from the card, concerning the possible use of the consumable 20 or of the spare part.

According to yet another example, the card 300, 300' contains data which will enable, after authentication of the card, authorising, or not, of the use of a software or a software function or a function of the printing machine.

According to another example, the card 300, 300' contains:

both data which will enable authorising, or not, of the use of a consumable 20 or of a spare part;

and, data which will enable authorising, or not, of the use of a software or a software function or a function of the printing machine (for example: rights of use of the printer).

The card 300, 300' can advantageously contain a set of technical data which are only valid for a given printer. For a printer that is already installed, this avoids creating a new program, or a new configuration, after the technical data relating to the printer in question have been modified. According to another example, this makes it possible to create a set of data for a new customer who purchases a printer: it is not the printer which is directly configured, but rather the card 300, 300'.

FIG. 8A shows the case of a card 300 intended to be read by contact by the printer 3, the card is then inserted in a slot 301 of the body of the printer, in order to come into contact with a reader circuit.

FIG. 8B represents a case of a card 300' intended to be read by RFID by the printer 3, which possesses an RFID reader 301 dedicated to the reading of the card 300'.

In the two cases, the data transmitted from the card to the printer can be of the type described below.

The consumable 20 (FIG. 8B) is, in the two cases, still equipped with the tag 21, which enables it to implement the steps described above, and with communication means, for example RFID communication means, which enable dialogue with the controller.

The card 300, 300' is a detachable element of the printer, which permits authorisation at two times, the card is serving, on the one hand, as an intermediary for authorising the use of a consumable (after having been itself authenticated), the latter being, on the other hand, authenticated according to one of the methods already described above.

In a variant, the card 300,300', after authentication by the controller, can authorise a consumable or detachable element which does not possess authentication means. The authorisation, by the controller, then proceeds either by an identification of technical data available on the consumable element, for example in a tag or a memory present thereon, or by data entered in the printer by the user, for example by reading an identification label available on the element or an item of data supplied therewith (in the packaging, in documentation attached to the element, etc.).

The order of the steps can therefore be, for example:

a) authentication of the card 300, 300', according to one of the methods described above;

b) reading, by the controller, of at least one item of data from the card 300, 300' (or supplied by same) concerning the possible use of the consumable 20 or of the spare part.

A particular use of the card 300, 300' solves the problem of a user who wishes, for example, to use spare parts or consumables (inks) from a third-party manufacturer (for example the case of an ink having very specific properties) and/or from a distribution network for which the protection policy of the consumables must be adapted.

In order to do this, the card 300, 300' can be configured machine by machine.

In general, this card, or a tag such as previously described, can contain at least one item of data, or an item of technical data of use, relating to the configuration of the printer and the expected behaviour thereof, and/or at least one item of information to be securely saved.

These technical data of use may contain, for example, at least one item of data or information concerning:

a)—at least one list of consumables that the printer can use;

b)—and/or the possible use, or not, of at least one consumable and/or of at least one spare part from a third-party manufacturer;

c)—and/or the authorisation for use, or not, of at least one consumable and/or of at least one recognised spare part;

d)—and/or at least one possible use of at least one software enabled in the controller of the printer;

e)—and/or equipment options or one or more peripherals used on the printer, for example a type of ink circuit and/or head;

f)—and/or use rights of the printer: this is the case, for example, for a "pay-per-print" option, according to which a user will see his/her invoice calculated as a function of the number of prints made. In this case, the card contains an item of information relating to a maximum number of authorised prints and the controller will, after each print, incrementally reduce this maximum number in the card;

g)—and/or, more generally, one or more items of data specific to the operation of the printer. Such data can be, for example:

data on the charge sequence of drops by the charging electrodes of the printing head of the printer, for example as a function of the different printing conditions, in particular the printing speed, or as a function of diverse printing configurations;

and/or technical data relating to the printing of a given message;

and/or data relating to the use of a particular printing font, and/or, more generally, relating to authorisation for access to certain functions of the printer.

These data can be read by the controller of the printer. As a function of the data read, the controller allows, or not, the envisaged use.

For example, the information concerning at least one list of consumables that the machine can use makes it possible to guarantee to the user that only a consumable compatible with his printer will be able to be used: if a consumable which is not part of the list in question is used, one or more functions of the machine can be blocked. This is an advantage for the user, who will thus avoid using an ink, or a printing head, the quality of which is insufficient for or incompatible with the printer used.

The information concerning authorisation of the use of at least one consumable and/or of at least one spare part from a third-party manufacturer, enables the use, or prohibition of the use, of said consumable or spare part, although this spare part or this consumable is not equipped with a tag or is equipped with another tag, for another printer, or is equipped with a tag uniquely for authorising another specific application. In the case where it is not equipped with a tag, a manual action of the operator can enable the use of the consumable or the part in question.

The information concerning authorisation of use, or not, of at least one unrecognised consumable and/or of at least one unrecognised spare part, allows use or prohibition of the use, of at least one spare part, or of at least one consumable, although this spare part or this consumable is not known by the manufacturer of the machine.

The information concerning at least a possibility of use of at least one specific software (or one software function), in the controller of the printer, enables the use, or the prohibition of the use, of this software or of this software function: for example, during manufacture, the controller of a printer is equipped with a first software L1 and a second software L2, different from L1 by at least the writing or one of the functions thereof. The specific tag only authorises the use of the first software L1. It will therefore not be possible to use the second software L2.

An example of authorisation of use of software or a software function corresponds to the use of functions enabling specific printings. Such specific printings may be anti-counterfeiting printings, for which the limiting of one or more software functions makes it possible to avoid copying of an anti-counterfeiting marking. This type of application can be implemented using a card such as 300, 300' which contains information relating to the authorisation of use of one or more pieces of software.

The information concerning one or more rights of use of the printer will allow the operation of the printer to be adapted and, in particular, allow storage of data as a function of the rights of the user. For example, for a "pay-per-print" option, the controller 20 will store the number of prints made.

An example of this type of right concerns the franking of envelopes, for which the user pays as a function of the number of prints made. A card, such as card 300, 300' can authorise a printer to perform the number of prints stored on the card.

Another application example is the following: the printer is coupled to a proof-reading system; this system comprises for example an imaging device for capturing at least one image of at least one part of a pattern printed by the printer, coupled with means for comparing said image with a reference image, which can for example be stored, or with reference data, which can for example be stored. Hence it is possible to verify the quality of a print. Such an application can be authorised at the time of manufacture of the printer or be authorised later at the site of the customer using a card 300.

Such software or software functions can already be present in the printer and authorised by a card 300, 300' after authentication of said card; or be stored in the card and sent to the printer after authentication.

In the case of an identification card 300, 300', this card may change over time; for example an identification card can be updated, or indeed a new identification card can be sent to the identification card holder, in order to update one or more items of data of the type mentioned above.

This identification card is generated, for example, by the manufacturer of the machine (see FIG. 7) and/or during a development of the configuration of the printer. In order to guarantee that the identification card is only usable on one given printer, during the initial installation in the printer, an association is produced between the card and the equipment of the printer by saving the identifier in the card corresponding to this particular machine. Once recorded, these data cannot be modified and the card is reserved for use on this particular machine.

This solution offers the possibility of easy and secure configuring of the functions of the printer, at the end of the production line, or even directly at the site of a user. In other words, it is possible to manufacture a unique machine and vary the use thereof by a user as a function of the data on the card 300, 300'.

The solution that has just been described above for a card is equally applicable to a consumable element, for example a cartridge or a spare part, the "tag" or circuit 200 thereof containing at least one item of information of one of types a) to g) listed above, for example relating to at least one other consumable, for example a cartridge or a spare part, that the machine can use.

An ink circuit of an inkjet printer, with the optional ink and solvent cartridges thereof, is described for example in document FR 13 52925 (WO2014/154830) or WO2009/047510.

Remember that the ink circuit mainly performs the following functions:

supply of ink of adequate quality under pressure to the drop generator of the head 1;

recovery and recycling of the fluids not used for printing on returning from the gutter of the head 1;

suction for purging of the drop generator situated in the head 1;

supply of solvent to the head 1, for rinsing carried out during head maintenance operations.

One and/or the other of the cartridges of this circuit can be equipped with a tag according to the present invention. A controller of the printer may be of the type described above.

The invention can be implemented in a continuous inkjet printer (CIJ) such as described above in connection with FIGS. 1 and 2. This comprises in particular a printing head 1, generally remote from the body of the printer 3, and connected to the printer by means, for example in the form of a flexible umbilical cord 2, containing the hydraulic and electrical connections enabling operation of the head.

The invention can advantageously be applied to a printer which is not connected to a communication network such as the Internet.

What is claimed is:

1. A method for authenticating a $1^{st}$ consumable or detachable element of a continuous inkjet printer, comprising:
   a)—generation, by a controller of the printer, of a $1^{st}$ item of random information and the dispatch thereof to an authentication circuit of the $1^{st}$ consumable element;
   b)—encryption of the $1^{st}$ item of random information by the authentication circuit of the $1^{st}$ consumable element, a $1^{st}$ encryption algorithm and a $1^{st}$ secret key, thereby forming a $1^{st}$ item of encrypted random information, and the dispatch of said item of information to the controller of the printer;
   c)—encryption of the $1^{st}$ item of random information by the controller of the printer and by a $2^{nd}$ encryption algorithm, and a $2^{nd}$ secret key, thereby forming a $2^{nd}$ item of encrypted random information;
   d)—comparison of, at least the $1^{st}$ item of encrypted random information with the $2^{nd}$ encrypted item of random information, in order to authenticate, or not, the $1^{st}$ consumable element;
   e)—and, if the $1^{st}$ consumable element is authenticated, at least one part of a $3^{rd}$ key, termed the shared key, is dispatched by the $1^{st}$ consumable or detachable element to the continuous inkjet printer, the controller of the printer containing a deciphering algorithm to decipher data with the shared key.

2. The method according to claim 1, further comprising:
   generation, by the authentication circuit of the $1^{st}$ consumable element, of a $2^{nd}$ item of random information, and dispatch thereof to the controller of the printer;
   encryption of the $2^{nd}$ item of random information by the controller of the printer, by the $2^{nd}$ encryption algorithm, and the $2^{nd}$ secret key, thereby forming a $3^{rd}$ item of encrypted random information, and dispatch thereof to the authentication circuit of the $1^{st}$ consumable element;
   encryption of this $2^{nd}$ item of random information by the authentication circuit of the $1^{st}$ consumable element, using the $1^{st}$ encryption algorithm and the $1^{st}$ secret key, thereby forming a $4^{th}$ item of encrypted random information;
   and step d) comprising comparison of at least the $3^{rd}$ item of encrypted random information with the $4^{th}$ item of encrypted random information.

3. The method according to claim 2, the comparison on the one hand of the $1^{st}$ item of encrypted random information with the $2^{nd}$ item of encrypted random information, and on the other hand of the $3^{rd}$ item of encrypted random information with the $4^{th}$ item of encrypted random information enabling reciprocal authentication, or not, of the $1^{st}$ consumable element and the printer, the method then comprising, if the reciprocal authentication is performed or validated, performance of step e).

4. The method according to claim 1, in which after step e), at least one item of data encrypted by a $3^{rd}$ third encryption algorithm, is dispatched from the $1^{st}$ consumable or detachable element to the continuous inkjet printer or vice versa.

5. The method according to claim 1, in which the shared key can vary over time and/or has a limited duration of validity.

6. The method according to claim 1, wherein:
   the $1^{st}$ secret key and/or, respectively, the $2^{nd}$ secret key, is, or has been, modified using an algorithm implementing an item of digital data available in, or associated with, respectively the $1^{st}$ consumable or detachable element or with the continuous inkjet printer;
   and/or, the shared key, is, or has been, modified using an algorithm implementing an item of digital data available in, or associated with, the $1^{st}$ consumable or detachable element and/or with the continuous inkjet printer.

7. The method according to claim 1, further comprising:
   an exchange, between the controller and the $1^{st}$ consumable or detachable element, and/or reading, by the controller and/or the $1^{st}$ consumable or detachable element, of at least one item of data concerning at least one $2^{nd}$ consumable or detachable element or at least one spare part that the printer can use, and/or at least one software that the printer can use, and/or at least one method of use that the printer can implement;
   then optionally:
   a comparison of at least one item of identification data, respectively of a consumable or of a spare part and/or of a software, with said at least one read or exchanged item of data, relating respectively to at least one $2^{nd}$ consumable element or at least one spare part that the printer can use, and/or at least one software that the printer can use, and/or the authorisation, or not, of the use of said consumable or of said spare part and/or of said software;
   and/or a comparison of at least one method of use that the printer can implement, with said at least one item of read or exchanged data, relating respectively to at least one method of use that the printer can implement and the adaptation of the mode of operation of the printer.

8. The method according to claim 1, wherein at least one part of the $2^{nd}$ secret key or of the optional shared key or of the exchange data is stored on a card, different and/or physically separated from the printer and of the $1^{st}$ consumable element, and which exchanges data with the printer using communication means.

9. The method according to claim 1, wherein one or more items of data is/are exchanged, between the $1^{st}$ consumable or detachable element and said continuous inkjet printer, by RFID or by contact.

10. The method according to claim 1, wherein said $1^{st}$ consumable or detachable element is an ink or solvent cartridge or a filter or a pump or a solenoid valve, or a removable module, for example of the ink circuit of the printer or of a printing head of the printer, or a data medium.

11. The method according to claim 7, in which the $1^{st}$ consumable or detachable element is a data medium, at least one $2^{nd}$ consumable element or detachable element or at least one spare part being an ink or solvent cartridge or a filter or a pump or a solenoid valve, or a removable module, for example the ink circuit of the printer or a printing head of the printer.

12. A control device of a continuous inkjet printer, or data medium, for authentication of a $1^{st}$ consumable or detachable element of said continuous inkjet printer, the device comprising:
- a generator of an item of random information, and for despatching same to an authentication circuit of the element;
- an encryption circuit for encrypting this item of random information, using a 1st encryption algorithm and a $1^{st}$ secret key, thereby forming an item of encrypted random information;
- a circuit to compare this item of encrypted random information and another item of encrypted random information received from a consumable or detachable element and for authenticating, or not, the $1^{st}$ consumable as a function of the result of the comparison;
- a receiver receiving, after authentication, at least a part of a key, termed the shared key, dispatched by said consumable or detachable element to the control device;
- a memory storing a $2^{nd}$ key, termed the shared key, and a $2^{nd}$ algorithm, termed the deciphering algorithm, to decipher at least one data with the shared key.

13. The control device or data medium according to claim 12, the $2^{nd}$ key being variable over time.

14. The control device or data medium according to claim 12, comprising RFID communication means or means for exchanging data by contact.

15. The control device or data medium according to claim 12, further comprising a memory for:
- storing at least one item of data concerning at least one consumable or at least one spare part that the printer can use, and/or at least one software that the printer can use and/or at least one method of use that the printer can implement;
- and, optionally, a circuit:
  - to compare at least one item of identification data of a consumable or of a spare part or of a software with said at least one stored item of data concerning at least one consumable or at least one spare part that the printer can use, and/or at least one software that the printer can use;
  - and/or to compare at least one method of use with said at least one item of stored data concerning at least one method of use that the printer can implement;
  - and/or to authorise, or not, the use of this consumable or this spare part or this software or the implementation of said method of use.

16. A continuous inkjet printer, comprising:
an ink circuit,
a printing head,
a hydraulic connection between the ink circuit and the printing head,
an electrical connection for supplying electrical power to said printing head,
a device and/or a data medium according to claim 12.

17. A consumable or detachable element for a continuous inkjet printer, (CIJ), comprising:
- a generator to generate an item of random information, and a circuit to despatch this item of random information to a controller of a printer, or a receiver to receive an item of random information from the controller of a printer;
- a circuit to encrypt this item of random information, using a $1^{st}$ encryption algorithm and a $1^{st}$ key, termed the secret key, thereby forming an item of encrypted random information;
- a circuit to compare this item of encrypted random information and another item of encrypted random information received from the controller of a printer, and for authenticating, or not, said printer as a function of the result of the comparison;
- a receiver to receive, after authentication, at least a part of a $2^{nd}$ key, termed the shared key, for example despatched by said printer to the consumable or detachable element, or for despatching at least a part of a $2^{nd}$ key, termed the shared key, for example to said printer;
- a memory to store said $2^{nd}$ key, termed the shared key, and a $2^{nd}$ algorithm, to decipher or encrypt at least one data with said shared key.

18. The consumable or detachable element according to claim 17, the $2^{nd}$ key being variable over time.

19. The consumable or detachable element according to claim 17, comprising an RFID interface means or an interface to exchange data by contact.

* * * * *